United States Patent [19]
Rist

[11] 3,954,158
[45] May 4, 1976

[54] DISC-BRAKE WITH MECHANICAL OPERATION

[75] Inventor: Michel Rist, Boulogne, France

[73] Assignee: Societe Anonyme Francaise du Ferodo, Paris, France

[22] Filed: May 6, 1975

[21] Appl. No.: 574,906

Related U.S. Application Data
[63] Continuation of Ser. No. 339,554, March 9, 1973, abandoned.

[30] Foreign Application Priority Data
Mar. 10, 1972 France .............................. 72.08360
Aug. 8, 1972 France ............................., 72.28538

[52] U.S. Cl. .............................. 188/72.7; 188/72.9; 188/73.3; 188/73.5
[51] Int. Cl.² ......................................... F16D 55/08
[58] Field of Search ................. 188/72.7, 72.9, 73.3, 188/73.5, 73.4

[56] References Cited
UNITED STATES PATENTS

| | | |
|---|---|---|
| 3,403,756 | 10/1968 | Thirion .............................. 188/73.3 |
| 3,662,864 | 5/1972 | Evans ............................. 188/72.7 X |
| 3,664,469 | 5/1972 | Maurice ............................. 188/73.3 |

*Primary Examiner*—George E. A. Halvosa
*Attorney, Agent, or Firm*—Young & Thompson

[57] ABSTRACT

The invention relates to a mechanically-operated disc-brake of the kind comprising a disc fast for rotation with the member to be braked, a fixed support, two brake-shoes arranged one on each side of the disc and slidably mounted in housings formed in the fixed support, an operating lever co-operating with one of the brake-shoes through a cam surface, and a transfer member on which the operating lever is articulated, and which is movable with respect to the disc for transmission to the other brake-shoe of the braking action applied by the operating lever, the transfer member being pivotally mounted with respect to the fixed support against the action of elastic devices, and further comprising structure enabling the transfer member to pivot about an axis which is substantially diametral with respect to the disc, the articulation axis of the operating lever on the transfer member extending along a direction substantially parallel to the diametral axis.

32 Claims, 17 Drawing Figures

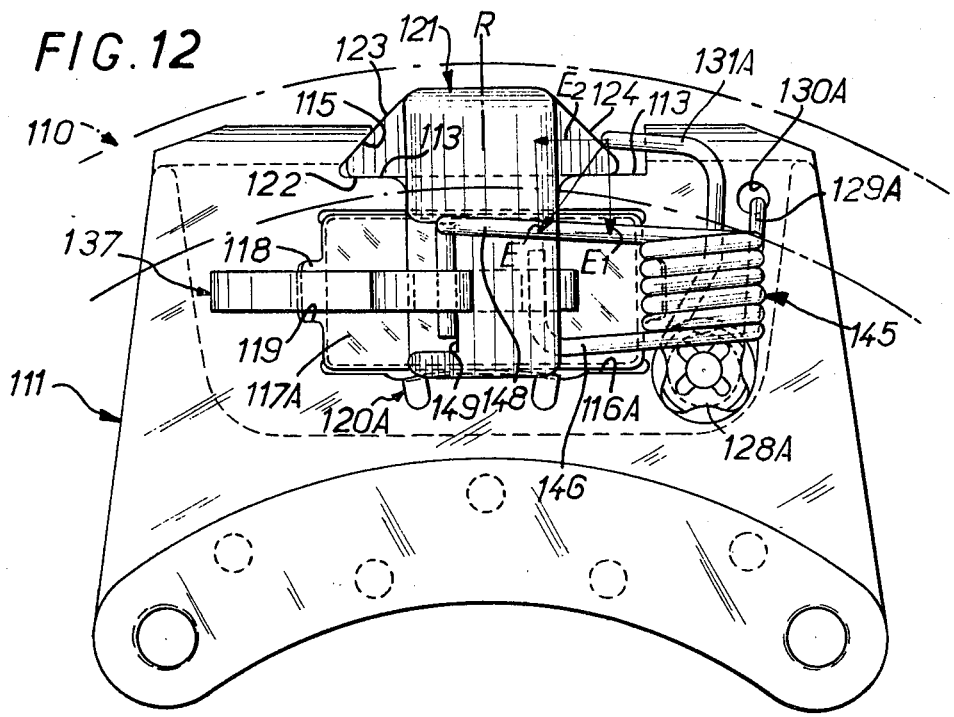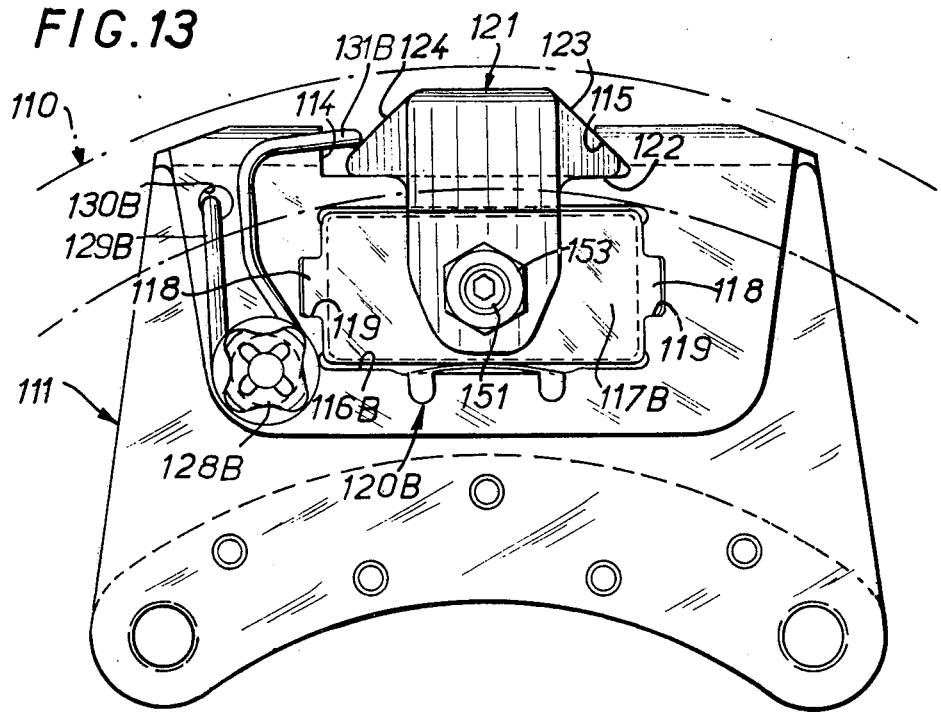

DISC-BRAKE WITH MECHANICAL OPERATION

This is a continuation of application Ser. No. 339,554, filed Mar. 9, 1973, now abandoned.

There has already been described a mechanically-operated brake, especially for automobile vehicles, comprising a disc fast for rotation with the member to be braked, a fixed support, two brake-shoes arranged on each side of the disc and slidably mounted in housings formed in the said fixed support, an operating level co-operating with one of the shoes by a cam surface, and a transfer member on which the said leve is articulated, and which is movable with respect to the disc for transmission to the second shoe of the braking action applied by the operating lever, the said transfer member being further mounted pivotably with respect to the fixed support against the action of elastic means, about an axis known hereinafter as the pivotal axis.

In practice, in the brake described above, this pivotal axis is at right angles to that of the disc, along a chord of this latter close to its periphery.

Although a brake of this kind has given and still gives satisfaction for certain applications, this arrangement results in a number of disadvantages.

First of all, it is essential that the traction cable which is coupled to the operating lever for actuating the brake should extend in a substantially diametral plane with respect to the disc.

While this arrangement is quite suitable when the brake is fitted on a non-steering wheel, for which it is possible to place it laterally, for a steering wheel and taking into account its to-and-fro movements and the difficulties of coupling of the traction cable which result, it would be necessary to install the brake at the upper part of such a steering wheel, which in general would not be suitable.

In addition, as the transfer member is permitted to rock about an axis at right angles to that of the disc, along a chord of this latter close to its periphery, its rocking movement makes it necessary to provide sufficient dead space extending radially beyond this disc, which results in a limitation of the permissible diameter of the disc for a given overall size.

The present invention has especially for its object a mechanically-operated disc brake free from these disadvantages and having furthermore other advantages.

The mechanically-operated disc brake according to the invention is of the kind comprising a disc fast for rotation with the member to be braked, a fixed support, two brake-shoes arranged on each side of the disc and slidably mounted in housings formed in the said fixed support, an operating lever co-operating with one of the shoes by a cam surface, and a transfer member on which the said lever is articulated and which is movable with respect to the disc for transmission to the second shoe of the braking action applied by the operating lever, the said transfer member being furthermore mounted pivotally with respect to the fixed support against the action of elastic means, and is characterized in that the said transfer member is permitted to pivot about an axis known hereinafter as the pivotal axis, substantially diametral with respect to the said disc, the articulation axis of the said lever on the said transfer member extending in a direction substantially parallel to the said pivotal axis.

By substantially diametral direction with respect to the disc, there is meant a direction which passes through the axis of this disc or in proximity to that axis.

It results from the characteristic arrangement of the brake according to the invention that the traction cable coupled to the operating lever extends in a plane which intersects the disc substantially along a chord of the disc, which renders possible and even facilitates the installation of such a brake on the lateral portions of such a disc, especially in the case where the brake is fitted on a steering-wheel, the operation of this brake being thus able to leave towards the top.

In addition, the pivotal movement of the transfer member is developed in a dead space arranged laterally on each side of the disc, which advantageously does not result in any limitation of the disc diameter.

However, this arrangement has the further advantage of facilitating the possible adoption of a particular arrangement, especially in the case where the transfer member has the shape of a U-stirrup engaged substantially radially on the disc and the brake-shoes.

According to this particular arrangement, the transfer member is in fact split-up into two U-shaped stirrups, each engaged substantially radially on the disc and the brake-shoes, the said stirrups are articulated at one of their extremities on a common cross-member, through the intermediary of which they bear againt one of the brake-shoes; these stirrups each receive at the other of their extremities the articulation of an operating lever which bears through a cam service against the other brakeshow, elastic means act between the said stirrups, a traction cable is coupled to one of the said levers, and a protective sheath surrounds the said cable and has its extremity in contact with the other of the said levers.

Thus, this sheath is not in abutment against a fixed point but against one of the operating levers, the movements of which it follows during the operation of the brake. This arrangement has the advantage of causing the sheath reaction to take part in the gripping action and therefore improves the efficiency of the unit.

Preferably, but not necessarily, for the articulation of the operating lever on the transfer member, either the operating lever or the transfer member comprises a pivotal edge which is pivotally engaged in a pivotal groove formed in the other said member.

Tests have shown that this arrangement, which is in fact intended to substitute an articulation of the type commonly known as the knife-edge type for a conventional articulation having an axis of rotation, is capable of increasing in a substantial manner the efficiency of the brake, which is the object in question.

In fact, it has proved that for the same braking torque, the force to be applied on the operating lever is reduced by means of this arrangement by about 15% as compared with the force to be applied under the same conditions on an operating lever articulated in a conventional manner on the associated transfer member.

According to a possible form of construction, the pivotal edge is formed integrally with the member on which it is carried and is made in a single piece with this latter, and/or the same condition applies to the pivotal groove.

In an alternative form, the pivotal edge is formed on a shaft fixed on the member which carries it, which may make it possible to give this edge a hardness different from that of the said member and/or whch facilitates possible machining of this pivotal edge which is capable of still further improving the efficiency.

Elastic application means are preferably provided in order to maintain the pivotal edge in contact with the associated pivotal groove.

The characteristic features and advantages of the invention will furthermore be brought out in the description which follows below, by way of example, reference being made to the accompanying diagrammatic drawings, in which:

FIGS. 12 and 13 are lateral views taken respectively in the direction of the arrows XII and XIII of FIGS. 10 and 11;

In these drawings, there will be recognized a brake of the same type as that described in the above preamble.

Figure 1:
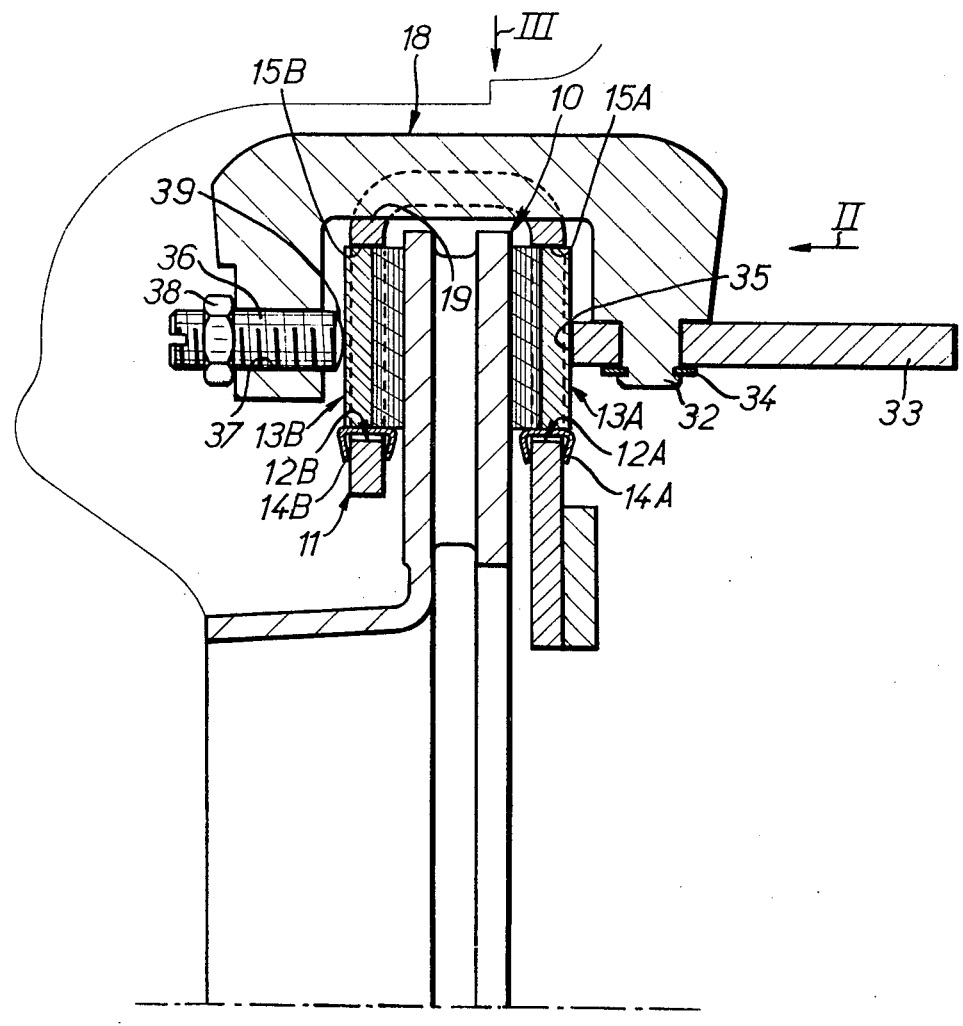
FIG. 1 is a view in axial cross-section of a brake according to the invention.
Figure 2:
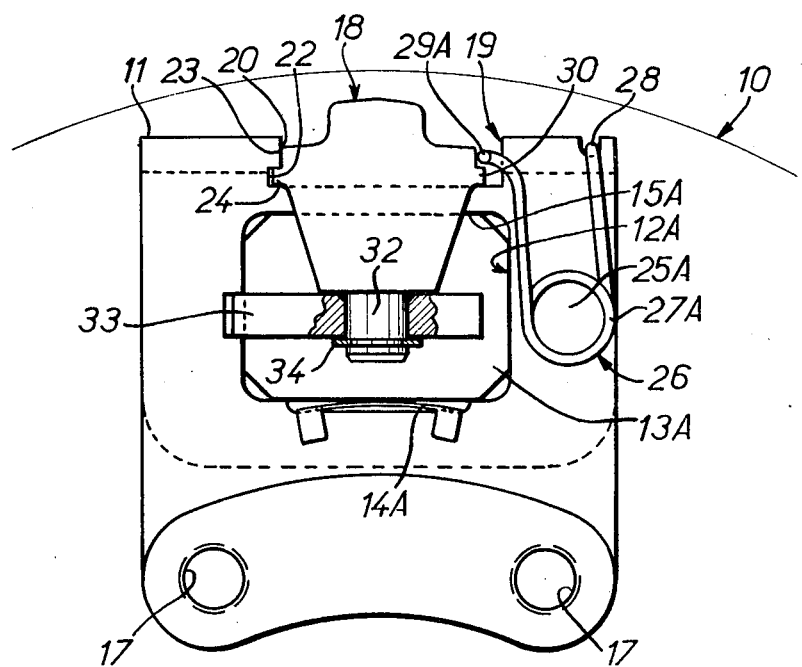
FIG. 2 is a lateral view of this brake looking in the direction of the arrow II of FIG. 1.

A brake of this kind comprises a disc 10 to be braked which, as shown, is of the ventilated type, and a fixed support 11 of U-shape which is engaged substantially radially on the disc 10 (FIG. 1), and which is provided with lugs 17 for the purpose of fixing it in position (FIG. 2).

On each side of the disc 10, the support 11 is cut-away in windows 12A, 12B for housings of brake-shoes 13A, 13B intended to be brought into application against the disc 10.

Figure 3:
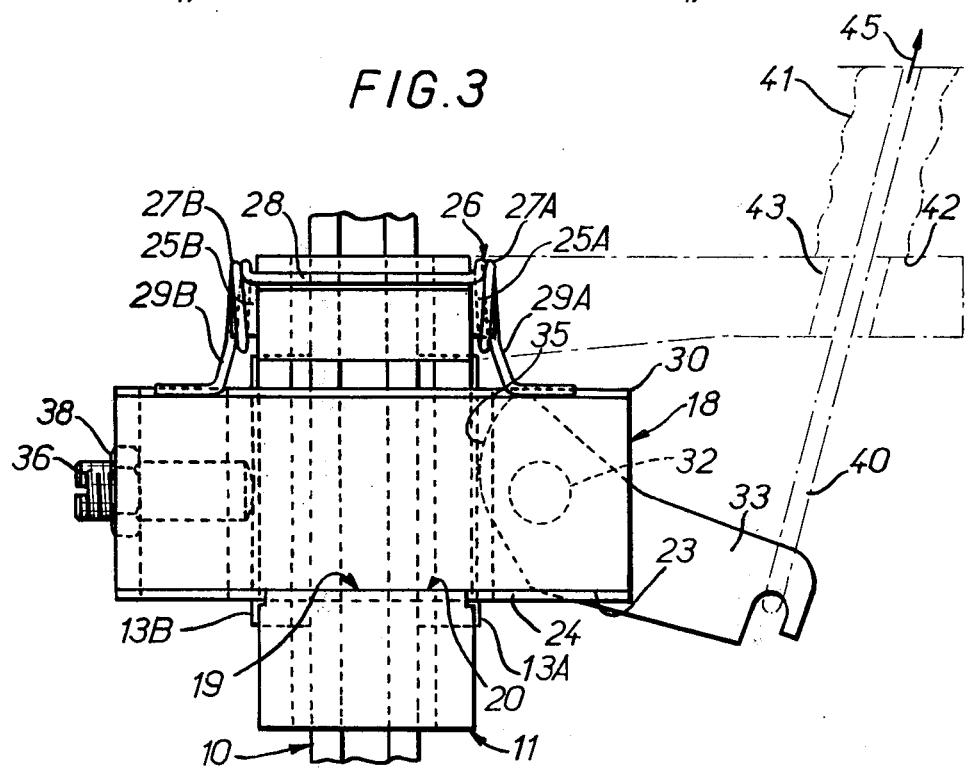
FIG. 3 is a plan view following the arrow III of FIG. 1.

According to the form of embodiment illustrated by FIGS. 1 to 3, there is associated with each brake-shoe 13A, 13B a spring blade 14A, 14B which urges it radially into application against that of the edges 15A, 15B of the corresponding housing 12A, 12B which is the closest to the periphery of the disc 10, and which is therefore the closest to the curved zone of the U-shaped support 11, this spring 14A, 14B being supported against that of the edges of the housings 12A, 12B which, parallel to that preceding, is farthest away from the periphery of the disc 10.

The brake according to the invention further comprises a transfer member 18 which, in the example shown, is a U-shaped stirrup engaged substantially radially on the disc 10 and the brake-shoes 13A, 13B, by means of a slot 19 formed transversely in the support 11 facing the periphery of the disc 10.

One of the transverse edges 20 of this slot 19 forms a supporting abutment, and parallel to this latter extends a groove 22; the abutment 20 and the groove 22 thus extend parallel to the axis of the disc.

In correspondence with this supporting abutment and this groove, the stirrup 18 is provided with a supporting surface 23 and a projecting bead 24, complementary to the groove 22.

Opposite to the supporting abutment 20, the fixed support 11 carries laterally two projecting pins 25A, 25B which serve for fixing elastic means which urge the stirrup 18 into application against the supporting abutment 20.

In the example shown in FIGS. 1 to 3, these elastic means are constituted by a spring 26 of round wire suitably shaped.

This spring comprises in its central portion two torsion elements 27A, 27B respectively engaged on the pins 25A, 25B of the fixed support 11, these torsion elements being coupled by a common portion 28 at one of their extremities, and being extended at the other of their extremities by lateral arms 29A, 29B which are supported against the stirrup 18 on each side of the said central portion, above a bead 30 carried as a projection on the stirrup 18 parallel to the bead 24 previously referred to.

On one side of the disc 10, the stirrup 18 carries a stud 32. This stud serves as an articulation shaft for an operating lever 33 which is held by a circlip 34 engaged on the stud 32, and which bears directly against the brake-shoe 13A by a rounded cam surface 35.

On the other side of the disc, the stirrup 18 carries an abutment which extends substantially perpendicular to the disc. In the example shown, this abutment is constituted by a screw 36 engaged by screwing into a threaded bore 37 of the stirrup 18, in cooperation with a locking nut 38. In contact with the brake-shoe 13B, this screw terminates in a rounded surface 39.

As shown diagrammatically by a broken line in FIG. 3, a tension cable 40 is coupled to the operating lever 33 and this cable 40 is surrounded by a sheath 41, the corresponding extremity 42 of which is supported against a fixed element 43 fast for example to the fixed support 11.

When a tractive pull is applied on the cable 40, in the direction of the arrow 45 of FIG. 3, there is a pivotal movement of the operating lever 33 about the stud 32.

In a first stage (FIG. 4) the operating lever 33 slides by its cam surface 35 in contact with the brake-shoe 13A and forces this latter to come into contact with the disc 10.

Conjointly, the corresponding force is transmitted by the stirrup 18 and the screw 36 to the brake-shoe 13B, which also comes into contact with the disc 10.

Thus, during the course of this first stage, there is simply an entry into contact of the brake-shoes 13A, 13B with the disc 10, the corresponding approach travel being more or less considerable, depending on the degree of wear of the friction linings of the brake-shoes.

Then, in a second stage (FIG. 5) and provided that the tractive pull on the cable 40 is continued, the operating lever 33 rolls without slip in contact with the brake-hoe 13A by its cam surface 35, and powerfully applies this latter against the disc 10, the corresponding force being transmitted as previously by the stirrup 18 and the screw 36 to the brake-shoe 13B which is thus also powerfully applied in its turn against the disc 10.

This latter is then gripped and therefore braked, if so desired, until it stops.

As soon as action on the cable 40 is released, the disc 10 is also released.

During the course of the second stage of operation described above, which is effected by a rolling movement without slip of the operating lever 33 against the brake-shoe 13A, by reason of the pulling action which is applied to it, the stirrup 18 is itself compelled to pivot about an instantaneous pivotal axis parallel to the pivotal axis of the operating lever 33, that is to say about an instantaneous axis of rotation which is substantially diametral with respect to the disc 10.

Thus, during this stage, the operating lever rolls and does not slip, which would result in a loss of efficiency by sliding under load.

The rocking movement of the stirrup 18 is effected against the action of the spring 26, and this latter, after releasing the action applied on the cable 40 brings the stirrup 18 back to its initial supported position against the abutment 20 provided for that purpose on the fixed support 11.

Figure 4:
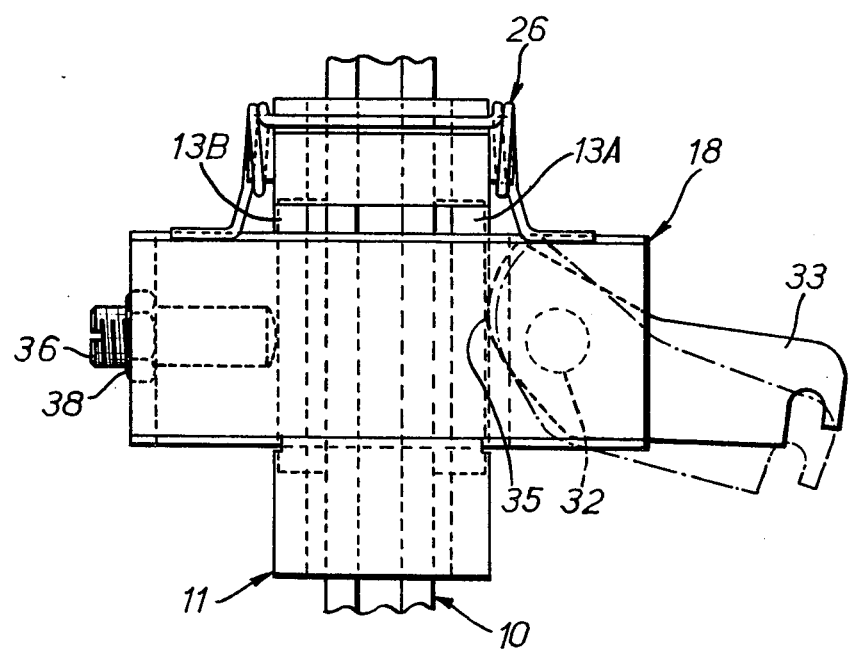
FIGS. 4 and 5 are views similar to FIG. 3 and illustrate the operation of this brake.
Figure 5:
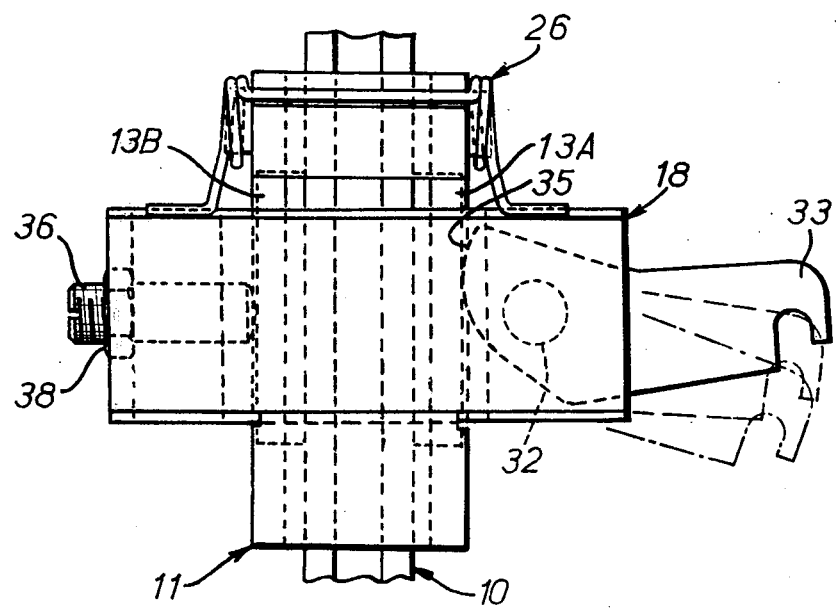

For the various stages of the operation, the initial and intermediate positions of the operating lever 33 and of the stirrup 18 are shown in broken lines in FIGS. 4 and 5 and the final positions are shown in full lines.

As will have been understood, the groove 22 of the fixed support 11 and the complementary bead 24 of the stirrup 18 conjointly constitute means for ensuring the retention of the stirrup 18 in a radial direction with respect to the disc 10, and it will be clear that the nature of these means could be inverted between the fixed support 11 and the stirrup 18, and that the bead 24 could be replaced by any other projection, and the groove 22 by any other housing complementary to such a projection.

The extremities of the lateral arms 29A, 29B of the spring 26 conjointly constitute with the projecting bead 30 of the stirrup 18, means for also ensuring the retention of this stirrup along the same radial direction with respect to the disc 10.

As will also have been understood, the rounded extremity 39 of the screw 36 facilitates the pivotal movement of the stirrup 18, and an action on this screw provides an initial setting of the position of the stirrup.

It will furthermore have been noted that during the course of its pivotal movement, the stirrup 18 does not encroach on the dead space intended for the periphery of the disc 10.

Figure 6:
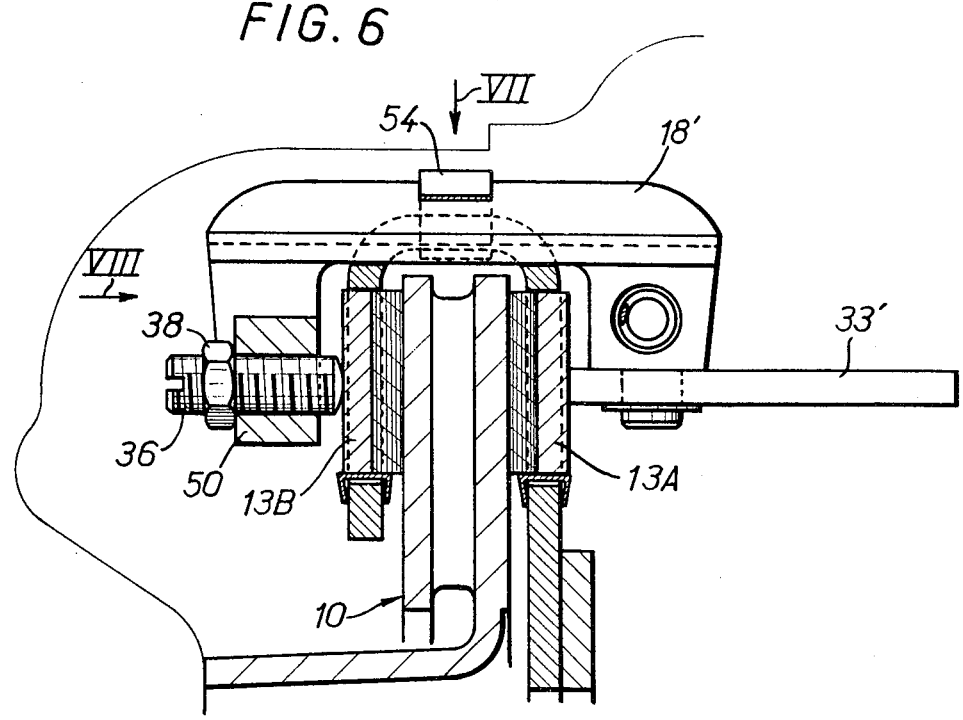
FIG. 6 is a view similar to FIG. 1, and relates to an alternative form of construction.
Figure 7:
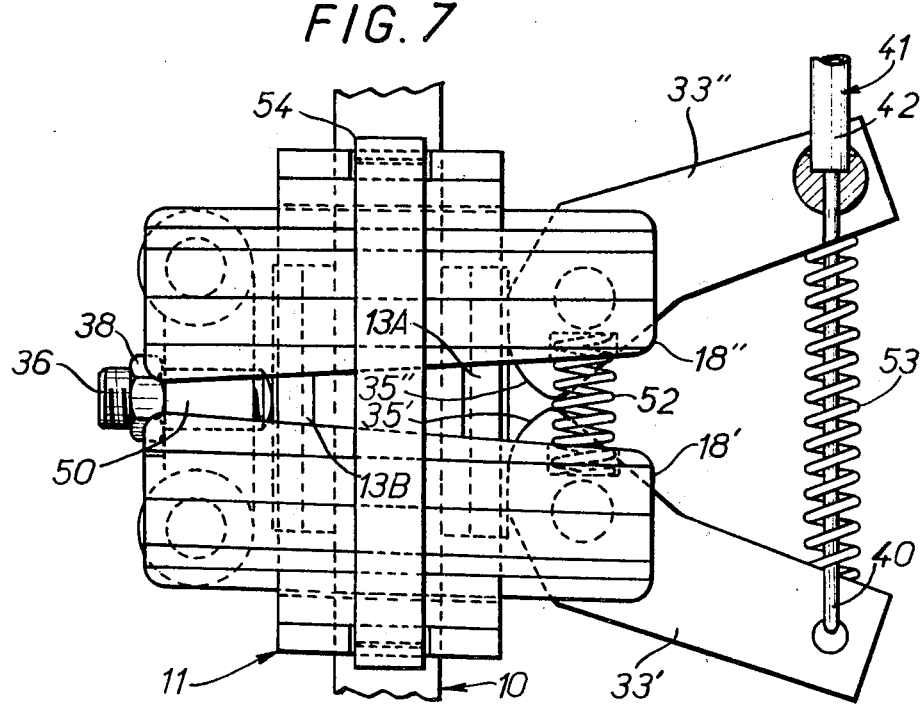
FIGS. 7 and 8 are views of this alternative form, looking respectively in the direction of the arrow VII and VIII of FIG. 6.
Figure 8:
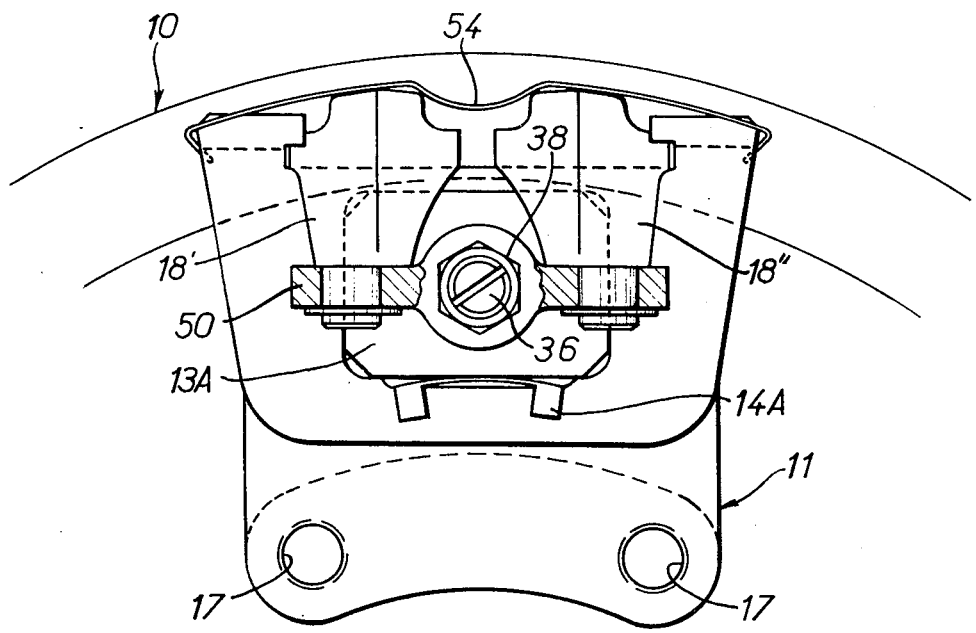

According to the alternative form of construction shown in FIGS. 6, 7 and 8, the transfer member of the brake according to the invention is split-up into two U-shaped stirrups 18', 18'' which are each engaged substantially radially on the disc 10 and the brake-shoes 13A, 13B, and which extend parallel to each other.

At one of their extremities, the stirrups 18', 18'' are articulated on a common cross-member 50 which carries the screw 36 intended to be applied against the brake-shoe 13B.

At the other of their extremities, the stirrups 18', 18'' each carry the articulation of an operating lever 33', 33''; these two levers 33', 33'' are both in contact with the brake-shoe 13A by cam surfaces 35', 35''.

A traction cable 40 is coupled to the operating lever 33', and this cable is surrounded by a sheath 41, the corresponding extremity 42 of which is supported against the other operating lever 35''.

A spring 52 is mounted between the stirrups 18', 18'' and a restoring spring 53 is provided between the operating levers 33', 33''. The spring 52 is stronger than the restoring spring 53, and this permits the operation described below.

The stirrups 19', 18'' are further capped by an elastic holding blade 54 which extends substantially in the plane of the disc 10 and which is pinned at its extremities on the fixed support 11.

The operation of this alternative form is similar in its principle to that of the form of embodiment previously described.

During the application of a tractive force on the cable 40, the operating levers 33', 33'' move closer together, since the restoring spring 53 yields before the spring 52, with first of all a simple sliding of their cam surfaces 35', 35'' in contact with the brake-shoe 13A. Then, with rolling and without slip on the said brake-shoe, they actuate the stirrups 18', 18'' which then also move closer together against the action of the spring 52, which is then overcome by the new support.

The brake is fully actuated.

When the action on the cable 40 is stopped, the springs 52 and 53 bring back the stirrups 18', 18'' and the operating levers 33', 33'' respectively into their initial positions.

This arrangement has the advantage of causing the reaction of the sheath to participate in the clamping operation of the brakes.

In the foregoing text, it has been assumed that for their retention along the corresponding diameter of the disc, the brake-shoes 13A, 13B were held by the springs 14A, 14B in contact with that of the edges 15A, 15B of their housings 12A, 12B which is the closest to the curved zone of the fixed support 11.

Figure 9:
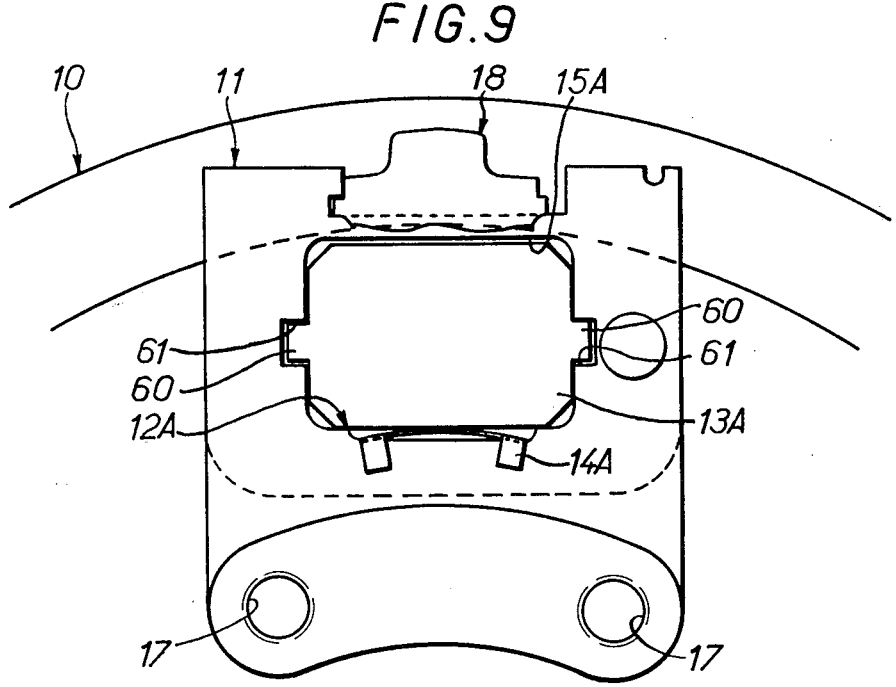
FIG. 9 is a view similar to FIG. 2, and is concerned with another alternative form of construction.

According to the alternative form of embodiment shown in FIG. 9, the shoe 13A, the only one visible on this figure, comprises lateral tongues 60 formed for example on the metal plate carrying the friction lining of this shoe.

Conjointly, the housing 12A of this brake 13A is provided laterally with slots 61 for engagement of the tongues 60 of this latter, preferably with play.

As will be readily understood, the support of the brake-shoe 13A against the fixed support 11 under the action of the spring 14A is not effected any more against the edge 15A of the housing 12A of this shoe, but by the tongues 60 against the corresponding edges of the slos 61.

A similar arrangement may be adopted for the brake-shoe 13B, if so desired.

It will be noted that in all cases the traction cable 40 extends along a direction substantially as a chord with respect to the disc 10, that is to say along a direction substantially parallel to a chord of this disc, which may facilitate the installation of the brake according to the invention in the lateral zones of a disc of this kind. It is only for convenience of the drawing that the brake has been shown installed at the upper portion of the said disc.

In FIGS. 10 to 17, there will be recognized a brake of the same kind as that described above.

This bake comprises a disc 110 of the ventilated type, and a fixed U-shaped support 111 engaged radially on each side of the disc 110.

Level with the edge of the disc 110, the fixed support 111 is cut-away by a slot 112, the bottom of which formed respectively in part by each of the wings of this fixed support, constitutes a supporting shoulder 113. One of the transverse edges of the slot 112, that is to say one of the edges of this slot which extends perpendicularly to the plane of the disc 110, forms a flank 114 substantially perpendicular to the supporting shoulder 113.

The other transverse edge of the slot 112 forms an oblique face 115 (FIG. 12) inclined against the supporting shoulder 113. From this supporting shoulder 113 to the corresponding free edge of the slot 112, the oblique face 115 approaches the radial plane R of the disc 110 which passes substantially into the central zone of the supporting shoulder perpendicular to the said shoulder.

On each side of the disc 110, the fixed support 111 is provided with two windows 116A, 116B which serve respectively as housings for brake-shoes 117A, 117B.

These brake-shoes each have lateral feet 118 engaged in lateral slos 119 in the windows 116A, 116B corresponding, and they are respectively subjected to the action of springs 120A, 120B which urge them radially towards the periphery of the disc 110 until their feet 118 come into abutment against the edges of the slots 119 which are nearest to the said periphery.

Thus maintained radially and circumferentially in both directions of rotation of the disc 110 by the housings 116A, 116B and their slots 118, the shoes 117A, 117B are in addition movable in these housings perpendicular to the plane of the disc 110.

The brake further comprises a transfer member 121.

In the example shown, this transfer member is a U-shaped stirrup engaged substantially radially on each side of the disc and of the fixed support, and forms a single solid piece produced for examle by moulding or stamping.

That of the internal faces of the stirrup 121 which extends facing the edge of the disc 110, forms a shoulder 122 which extends substantially perpendicular to the plane of the disc 110 and perpendicular to the radial plane of this disc passing through the central zone of the stirrup, and which is intended to cooperate with the supporting shoulder 113 provided for that purpose on the fixed support 111.

One of the longitudinal edges of this stirrup, that is to say one of its edges substantially perpendicular to the plane of the disc 110, comprises an oblique face 123 facing the shoulder 122, and this face cooperates in the same way as a dove-tail assembly, with the oblique face 115 provided on the fixed support 111. For this purpose, these faces 115, 123 are complementary, that is to say they have the same inclination respectively as regards the supporting shoulder 113 of the fixed support 111 and the shoulder 122 of the stirrup 121.

On its other longitudinal edge, the stirrup 121 also has an oblique face 124. The oblique faces 123, 124 of the stirrup 121 are convergent in a direction moving away from the axis of the disc 110.

Against the oblique face 124 are applied the elastic means which, in the example shown, are constituted by two torsion springs 126A, 126B respectively engaged on studs 127A, 127B carried as projections on the fixed support 111 perpendicular to the disc 110 and on each side of this disc, the said springs being held on the said studs by circlips or other elastic washers 128A, 128B.

Each of the springs 126A, 126B has an arm 129A, 129B, the extremity of which curved back in a square, is engaged in a hole 130A, 130B formed in the fixed support 111.

It further comprises a second arm 131A, 131B supported against the oblique face 124 of the transfer member or stirrup 121.

By reason of the inclination of this face, the elastic force E (FIG. 12) applied to the stirrup 121 by the torsion springs 126A, 126B has a component E1 perpendicular to the supporting shoulder 111, and which therefore urges this transfer member into application against the said shoulder, by its own shoulder 122, and a component E2 parallel to the supporting shoulder 113 of the fixed support 111 and which therefore urges the transfer member 121 into application against the oblique face 115 of the fixed support 111, by its own oblique face 123 complementary to the preceding.

Thus, the springs 126A, 126B constitute elastic maintaining means which ensure economically by themselves both the maintenance of the transfer member with respect to a radial direction of the disc and the maintenance of this transfer member in a tangential direction perpendicular to that preceding, in cooperation with the associated fixed support.

On the side of the brake-shoe 116A, the transfer member or stirrup 121 has on the one hand a pivotal edge 133 which extends substantially perpendicular to the shoulder 122 of this stirrup, and on the other hand a slot 134 which extends substantially perpendicular to the pivotal edge 133 in the central zone of this latter.

In the example shown, the pivotal edge 133 is formed integrally with the transfer member or stirrup 121 on which it is carried, and is formed in a single piece with the stirrup during its moulding.

Also in the example shown, the bottom 135 of the slot 134 forms a flat strip parallel to the plane of the disc 110.

In the slot 134 of the transfer member 121 is engaged the extremity 136 of an operating lever 137 which extends substantially perpendicular to the plane of the disc 110. This extremity 136 of the operating lever 137 comprises a flat strip 138 intended to cooperate in abutment with the bottom 135 of the slot 134.

The other extremity 139 of the operating lever 137 is intended to be coupled to any traction cable (not shown) and in the form shown, is given the form of a hook for that purpose.

The operating lever 137 is provided with a pivotal groove 140 intended to cooperate in the pivotal action of the edge 133 provided on the transfer member 121.

In the example shown, this pivotal groove 140 is formed on a shaft 141 fixed on the operating lever 137 perpendicular to this latter, and for example as shown, is forcibly engaged in an opening 142 formed in this latter.

Thus, the operating lever is pivotally mounted in a slot in the transfer member.

This arrangement, which is more particularly but not exclusively suited to the case in which the transfer member is a solid one-piece construction, advantageously results in an especially economic mounting of the associated operating lever.

As in the previous case, the operating lever 137 has a cam surface 143 through which it bears against the brake-shoe 117A.

With the operating lever 137 are associated elastic application means intended to ensure the maintenance in contact of the pivotal groove 140 with the pivotal edge 133.

In the example shown, these elastic application means comprise a torsion spring 145, of which one arm 146 has its extremity folded in a square and engaged in a hole 147 in the operating lever 137 while the other arm 148 has its extremity bent back in a square and supported against the bottom of a shoulder 149 formed for that purpose on the transfer member or stirrup 121.

As will be understood, these elastic application means further constitute in themselves elastic restoring means which urge the operating lever 127 towards a position of rest for which its flat strip 138 is applied against the flat strip 135 formed by the bottom of the slot 134 of the stirrup 121.

This arrangement advantageously gives the operating lever a well-defined position of rest.

On the side of the brake-shoe 117B, the transfer member or stirrup 121 has a threaded passage 150 which extends substantially perpendicular to the plane of the disc 110.

In this threaded passage is engaged by screwing a threaded shaft 151 which has a rounded profile 152 in contact with the brake-shoe 117B, and which is locked in position on the transfer member or stirrup 121 by a nut 153.

Figure 11:
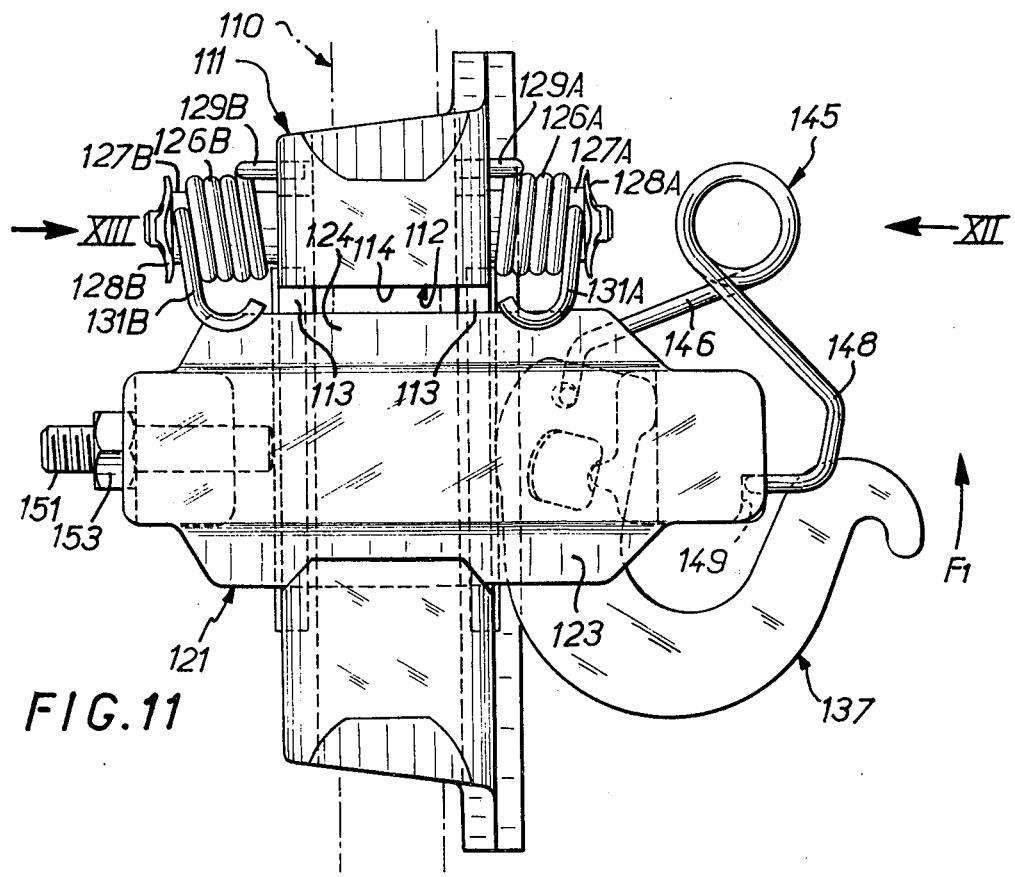
FIG. 11 is a plan view of this brake looking in the direction of the arrow XI of FIG. 1.
Figure 14:
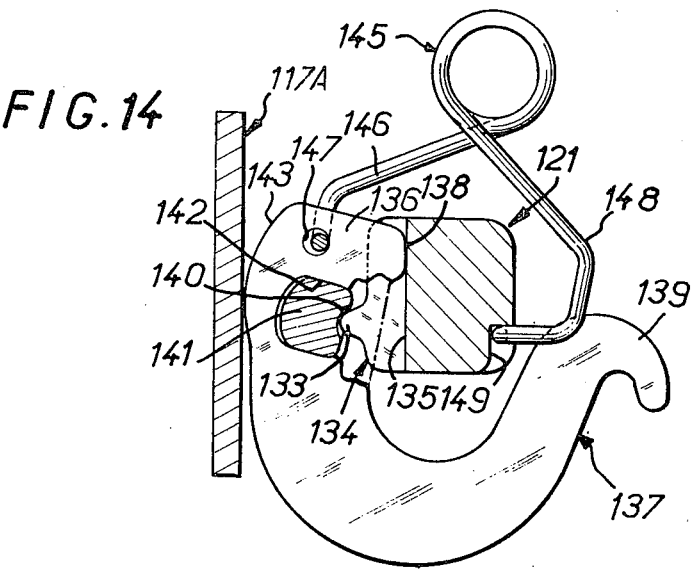
FIG. 14 is a partial view in cross-section of this brake, taken along the line XIV—XIV of FIG. 1.

When a tractive force is applied on the operating lever 137 in the direction of the arrow F1 of FIG. 11, this operating lever pivots by its groove 140 about the pivotal edge 133 carried by the transfer member 121 and by its cam surface 143, applies the brake-shoe 117A against the disc 110.

Figure 10:
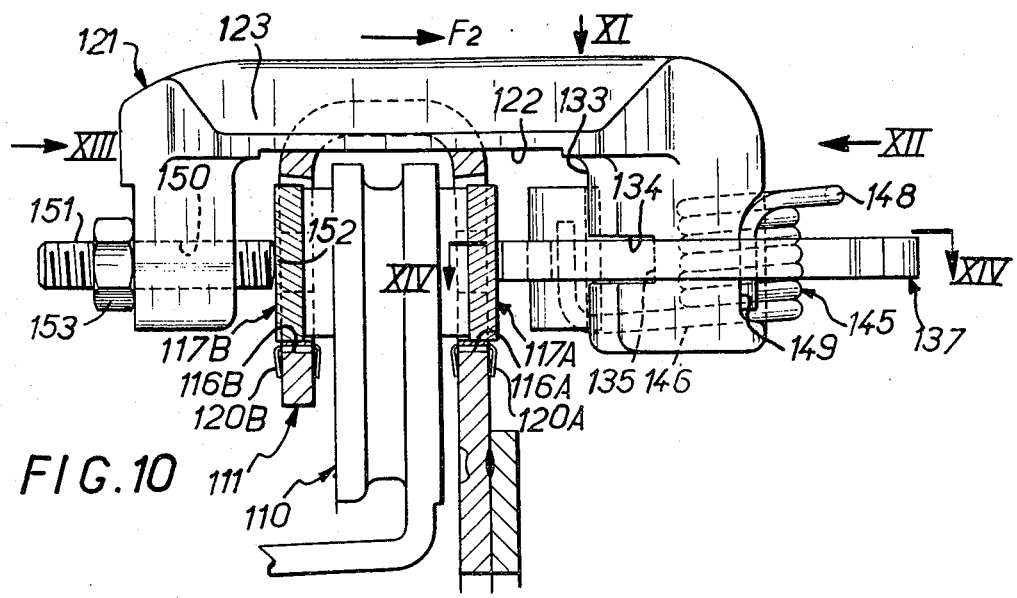
FIG. 10 is a view in elevation with axial cross-section of another brake with mechanical operation, according to the present invention.

Conjointly, and in fact due to this application, the transfer member 121 is moved perpendicularly to the disc 110 in the direction of the arrow F2 of FIG. 10, and by the threaded shaft 151 applies the brake-shoe 117B against the disc 110.

The disc 110 is thus gripped by the brake-shoes 117A, 117B and is thus braked, if so desired, until it stops.

In practice, and following a process described above, the application of the brake-shoes 117A, 117B against the disc 110 is carried out in two stages: in a first stage, the cam surface 143 slides in contact with the shoe 117A, the transfer member 121 moves in the direction of translation, and the shoes 117A, 117B come simply into contact with the disc 110; in a second stage, the cam surface 143 rolls without sliding on the shoe 116A, and, apart from its movement of translation, the transfer member 121 carries out a rocking movement about a radial direction of the disc passing through the middle of its central portion, the shoes 117A, 117B being then powerfully applied against the disc 110.

When the tractive force applied on the operating lever 137 is released, this lever returns to its position of rest, as defined above, under the action of the spring 145, and the disc 110 is released.

Figure 15:
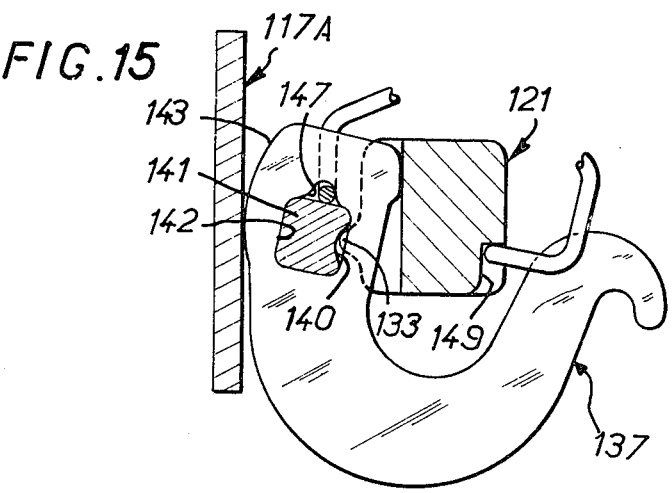
FIG. 15 is a view similar to FIG. 14 and relates to an alternative form of construction.

According to the alternative form of construction illustrated by FIG. 15, the squared extremity of the arm 146 of the spring 145 of the operating lever 137 is engaged, not in a special hole formed in the lever, but in a slot 247 formed along the opening edge 142 of this lever, in which is engaged the shaft 141 which carries its pivotal groove 140. The extremity of the arm 146 of the spring 145 is thus blocked between the shaft 141 and the edge of the opening 142.

Figure 16:
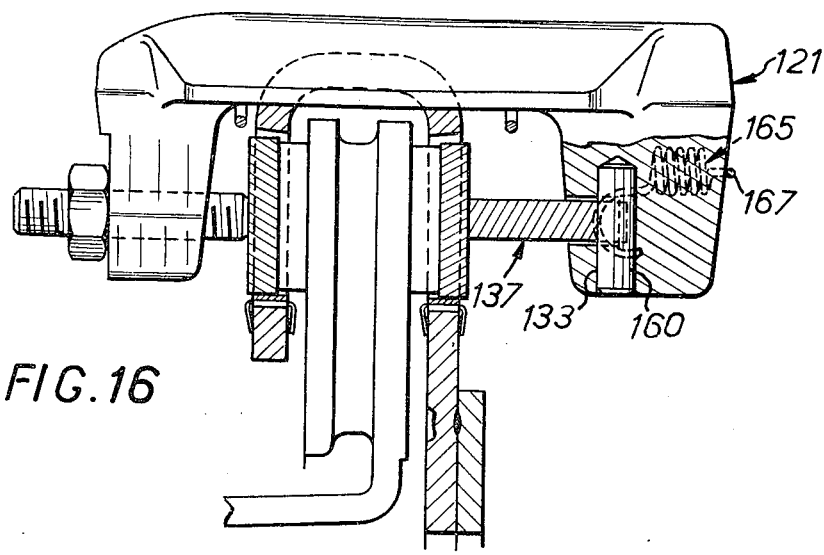
FIGS. 16 and 17 are views respectively similar to FIGS. 10 and 11 and are concerned with another alternative form of construction.
Figure 17:
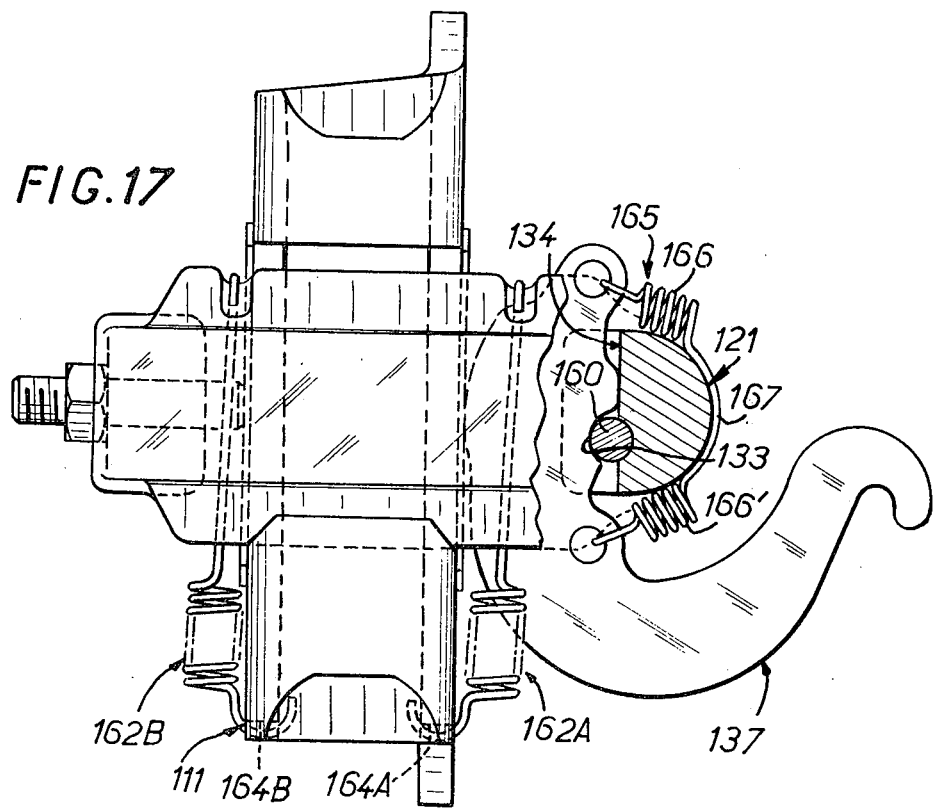

According to the alternative form of construction illustrated by FIGS. 16 and 17, the pivotal edge 133 is formed by a special shaft 160 fixed on the transfer member 121 perpendicularly to its slot 134.

According to this form of construction, the elastic maintenance means associated with the stirrup 121 comprise two tension springs 162A, 162B, coupled on the one hand to the stirrup 121 after passing under this latter and on the other hand to the fixed support 111 by means of slots 164A, 164B provided for that purpose on the stirrup.

Also according to this form of embodiment, the elastic application and restoring means associated with the operating lever 137 comprise a tension spring 165 passed round one arm of the stirrup 121, from one point of the operating lever to another.

Preferably, and as shown, this spring 165 is made in two sections 166, 166' coupled together by a straight central portion which is alone in contact with the stirrup 121.

The present invention is of course not limited to the forms of embodiment described and illustrated, but includes all alternative forms of construction and/or of combination of their various elements.

In particular, in connection with the forms of construction shown in FIGS. 10 to 17, the respective positions of the pivotal edge and the pivotal groove may be interchanged between the transfer member and the operating lever, and in the case where this pivotal edge is formed on a special shaft, the latter may equally well be fixed on the operating lever instead of on the transfer member.

Instead of having the shape of a U-stirrup engaged substantially radially on each side of the disc and the fixed support, the transfer member could have generally an annular configuration and may surround the fixed support, the disc and the brake-shoes, substantially parallel to a chord of the disc close to the periphery of the said disc.

With regard to the fixed support, instead of being a U-shaped member, it may be in the shape of a T.

Finally, the abutments which serve to define the position of rest of the operating lever could have a form different from that of the flat strips described above.

What I claim is:

1. A parking type disc brake including a disc mounted for rotation with a member to be braked, a fixed support, a brake shoe arranged on each side of said disc and slidably mounted in openings formed in said fixed support, an operating lever having a cam surface cooperating with one of said shoes, a pivot member pivotally mounting said operating lever on a transfer member, said transfer member being displaceable relative to said disc for transmitting to the other shoe activating force applied by said operating lever, means pivotally mounting said transfer member with respect to said fixed support about a pivotal axis substantially parallel to a line passing through the center of said disc, the axis about which said lever pivots on said transfer member being substantially parallel to said pivotal axis, said operating lever pivoting in a plane substantially perpendicular to and chordal of said disc, said transfer member being a U-shaped stirrup which extends over the edge of the disc and substantially radially outwardly of said disc and said brakeshoes and which is received on said fixed support, said stirrup having two opposed first and second longitudinal surfaces substantially extending parallel to the axis of said disc, resilient means acting on said first longitudinal surface of said stirrup and urging said stirrup in two component directions into engagement with said fixed support including a first component direction urging the stirrup radially inwardly toward the axis of the disc and a second component direction substantially perpendicular to said first component direction urging the said second longitudinal surface of said stirrup into engagement with a corresponding surface on the fixed support while the said first longitudinal surface of said stirrup is free of any engagement with said fixed support, so that when the operating lever is pivoted about said pivot axis the transfer member can be also pivoted against the force exerted by said resilient means about the said pivotal axis parallel to said pivot axis and so move that the said first longitudinal surface becomes oblique with regards to its initial position.

2. A disc brake as claimed in claim 1, further comprising a tensioning cable coupled to said operating lever said cable being covered by a sheath, the end of the sheath corresponding to the end of the cable being in abutment against a fixed point.

3. A disc brake as claimed in claim 1, wherein said corresponding surfaces on said fixed support comprise retaining means for said transfer member, said retaining means acting along a line passing substantially through the center of said disc.

4. A disc brake as claimed in claim 3, in which said retaining means comprises at least one projection formed on said transfer member and adapted to cooperate with a complementary notch formed in said fixed support.

5. A disc brake as claimed in claim 3, in which said retaining means comprises at least one projection formed on said fixed support and adapted to cooperate with a complementary notch formed in said transfer member.

6. A disc brake as claimed in claim 1, in which at least one of said brake shoes is provided with laterally extending tongues, the corresponding opening in said fixed support being provided with laterally extending slots, said tongues being received in said slots for maintaining said one shoe along a diameter of the disc passing through said one shoe.

7. A disc brake as claimed in claim 1, further comprising a groove formed on said operating lever and resilient application means associated with said operating lever for maintaining said groove in contact with said pivot member.

8. A disc brake as claimed in claim 7, in which said resilient application means associated with said operating lever is resilient return means.

9. A disc brake as claimed in claim 7, in which said resilient application means associated with said operating lever comprises a tension spring passing over said transfer member between two points on said operating lever.

10. A disc brake as claimed in claim 9, in which said tension spring comprises two spring sections coupled together by a plain portion which alone is in contact with said transfer member.

11. A disc brake as claimed in claim 1, further comprising resilient return means associated with said operating lever for urging said lever towards a rest position in which an abutment on said operating lever abuts against an abutment on said transfer member.

12. A disc brake as claimed in claim 11, in which said abutment on said operating lever is constituted by a flat strip.

13. A disc brake as claimed in claim 1, wherein said second mentioned longitudinal surface of said stirrup is oblique with respect to a radial plane passing through the central zone of the disc, said corresponding surface on the fixed support being an oblique surface, said resilient means urging said oblique surfaces into contact with each other substantially perpendicular to the radial plane.

14. A disc brake as claimed in claim 13, in which said resilient means for said transfer member comprises at least one tensior spring coupled to said transfer member and to said fixed support.

15. A disc brake as claimed in claim 13 in which the first mentioned longitudinal surface of said stirrup is also oblique with respect to a radial plane passing through the central zone of the disc and the two oblique surfaces of said stirrup converge in a direction extending away from the center of said disc.

16. A disc brake as claimed in claim 1, in which said transfer member is a solid one-piece member.

17. A disc brake as claimed in claim 1, in which said operating lever is pivotally mounted in a slot in said transfer member.

18. A disc brake as claimed in claim 1, in which said transfer member comprises two U-shaped stirrups, each engaged substantially radially over said disc and said brake shoe, said stirrups being articulated at one of their extremities on a common cross-member through the intermediary of which they bear against one of said brake shoes, said stirrups each being adapted to receive at their other extremity, an operating lever bearing by a cam surface against the other brake shoe, said resilient means acting between said stirrups, a tension cable coupled to one of said levers and a protecting sheath enclosing said cable, the extremity of said sheath being supported against the other said lever.

19. A disc brake as claimed in claim 18, and further comprising elastic means provided between said levers, these latter elastic means being weaker than those provided between said stirrups.

20. A disc brake as claimed in claim 18, and further comprising retention means provided for each said transfer member, said retention means acting along a substantially diametral direction with respect to said disc.

21. A disc brake as claimed in claim 20, in which said retention means comprise at least one projection formed on said transfer member and adapted to cooperate with a complementary housing formed on said fixed support.

22. A disc brake as claimed in claim 20, in which said retention means comprise at least one projection formed on said fixed support and adapted to cooperate with a complementary housing formed in said transfer member.

23. A disc brake as claimed in claim 20, in which said retention means comprise a projecting portion formed on said transfer member and elastic means associated with said transfer member and supported beyond said projection.

24. A disc brake as claimed in claim 20, in which said retention means comprise a spring blade located on the upper part of said stirrup, said blade being fixed at its extremities on said fixed support.

25. A parking type disc brake including a disc mounted for rotation with a member to be braked, a fixed support, a brake shoe arranged on each side of said disc and slidably mounted in openings formed in said fixed support, an operating lever having a cam surface cooperating with one of said shoes, means pivotally mounting the operating lever on a transfer member, said transfer member being displaceable relative to said disc for transmitting to the other shoe braking force applied by said operating lever, means pivotally mounting said transfer member with respect to said fixed support about a pivotal axis substantially parallel to a line passing through the center of said disc, the axis about which said lever pivots on said transfer member being substantially parallel to said pivotal axis, and said operating lever being pivotal in a plane substantially perpendicular to and chordal of said disc, and said means pivotally mounting said operating lever on a transfer member including a pivot member on one of said operating lever and said transfer member and a groove on the other of said lever and said transfer member, said pivot member and said groove being in line contact with each other, said transfer member being a U-shaped stirrup which extends over the edge of the disc and substantially radially outwardly of said disc and said brakeshoes and which is received on said fixed support, said stirrup having two opposed first and second longitudinal surfaces substantially extending parallel to the axis of said disc, resilient means acting on said first longitudinal surface of said stirrup and urging said stirrup in two component directions into engagement with said fixed support including a first component direction urging the stirrup radially inwardly toward the axis of the disc and a second component direction substantially perpendicular to said first component direction urging the said second longitudinal surface of said stirrup into engagement with a corresponding surface on the fixed support while the said first longitudinal surface of said stirrup is free of any engagement with said fixed support, so that when the operating lever is pivoted about said pivot axis the transfer member can be also pivoted against the force exerted by said resilient means about the said pivotal axis parallel to said pivot axis and so move that the said first longitudinal surface becomes oblique with regards to its initial position.

26. A parking type disc brake according to claim 25, wherein said groove is formed along a side of said operating lever opposite said cam surface.

27. A disc brake as claimed in claim 25, wherein the pivot member is on said operating lever and the groove is formed in said transfer member.

28. A disc brake as claimed in claim 25, wherein the pivot member is on the transfer member and the groove is formed in said operating lever.

29. A disc brake as claimed in claim 25, in which said pivot member is integrally formed with one of the operating lever and transfer member.

30. A disc brake as claimed in claim 25, wherein said pivot member is formed as a pin mounted on the transfer member.

31. A disc brake as claimed in claim 25, wherein said groove is formed integrally with said transfer member.

32. A disc brake as claimed in claim 25, in which said groove is formed in a shaft fixed on the member on which it is carried.

* * * * *